United States Patent Office 3,761,272
Patented Sept. 25, 1973

3,761,272
PHOTOGRAPHIC ELEMENTS CONTAINING
ULTRAVIOLET-ABSORBING POLYMERS
Marc Godfried Mannens, Mortsel, Jan Jaeken, Hove, Wilhelmus Janssens, Aarschot, and Jan Jozef Priem, Mortsel, Belgium, assignors to Agfa-Gevaert N.V., Mortsel, Belgium
No Drawing. Filed May 17, 1971, Ser. No. 144,251
Claims priority, application Great Britain, June 9, 1970, 27,977/70
Int. Cl. G03c 1/84
U.S. Cl. 96—84 R                              12 Claims

ABSTRACT OF THE DISCLOSURE

The invention claims an ultraviolet-absorbing filter layer composition formed from an aqueous solution of a hydrophilic colloid having dispersed therein a hydrophobic copolymer obtained by emulsion polymerization of at least one $\alpha,\beta$-ethylenically unsaturated monomer and of an ultraviolet-absorbing, solid, water-insoluble monomer of the formula:

$$CH=C-C-A-Z$$
$$\phantom{CH=}R\phantom{-}R'\phantom{-}O$$

wherein Z is H or Z', with Z' representing a substituted benzotriazole group of the formula:

[structure: benzotriazole with X, X' on benzo ring, N-N=N, attached to phenyl ring bearing OH, Y, Y']

R is H, —$CH_3$, —CN, —COOH or —COAZ'
R' is H, —$CH_3$, or —$CH_2$COAZ'
A is —O— or —NH
or A and R form together a cyclic imide group,
or A and R' form together a cyclic imide group, A being bound to the substituted benzotriazole group of Z' via the carbocyclic phenyl group or via the carbocyclic benzo group.

The ultraviolet-absorbing filter layer composition may be used for the protection of light-sensitive photographic materials against ultraviolet light and for the production of ultraviolet filters and filter layers.

---

The present invention relates to ultraviolet-absorbing polymers, their use for the protection of light-sensitive photographic materials, their use for the production of ultraviolet filters and filter layers and, as industrial product, the filters protecting and photographic materials protected from the injurious effects of ultraviolet radiation by the aid of these polymers.

Photographic light-sensitive elements can be protected from the injurious effect of light by mixing ultraviolet-absorbing compounds with the light-sensitive compositions or by the provision of special filter layers containing the ultraviolet-absorbing polymer. If the photographic element is intended for use in colour photography, the ultraviolet filter layer need not be an outer layer, but may be an interlayer, i.e. a layer provided under the layer or layers that do not require the protection and over the layer or layers that need protection. Ultraviolet-absorbing polymers may also be incorporated into the support (paper or film) or the support may be provided with an ultraviolet-absorbing filter layer before the application of the light-sensitive emulsion layer or layers thereto, in order to minimize the reflectance of light from the surface of the support.

We have found that primary dispersions of particular hydrophobic copolymers, which are obtained by the emulsion copolymerisation of the corresponding monomers, can very easily be mixed with hydrophilic colloid binder materials and form extremely useful ultraviolet-absorbing filter layers that are colourless, very stable to light, and photographically inert.

According to the invention an ultraviolet-absorbing filter layer composition is provided that is formed from a mixture of an aqueous solution of a hydrophilic colloid binder material and a primary dispersion with a concentration of 5 to 60% by weight of a hydrophobic ultraviolet-absorbing copolymer obtained by emulsion copolymerisation of at least one $\alpha,\beta$-ethylenically unsaturated monomer with a copolymerisable ultraviolet-absorbing solid, water-insoluble monomer according to the following structural formula:

$$CH=C-C-A-Z$$
$$\phantom{CH=}R\phantom{-}R'\phantom{-}O$$

wherein:

Z=H or Z' that represents a substituted benzotriazole group of the formula:

[structure: benzotriazole with X, X' on benzo ring, attached via N to phenyl ring bearing OH, Y, Y']

R=H, —$CH_3$, —CN, —COOH, or —COAZ',
R'=H, —$CH_3$, or —$CH_2$COAZ' (in the latter case R being H),
A=—O— or —NH—,
or A and R together with —CH=CR'—CO— form a cyclic imide ring substituted with the benzotriazole group of Z' (in this case R' being H or —$CH_3$),
or A and R' together with —C—CO— form a cyclic imide ring substituted with the benzotriazole group of Z' (in this case R being H),
each of X, X', Y, and Y' (same or different) represents a hydrogen atom, an alkyl group of 1 to 4 carbon atoms, an alkoxy group, a halogen atom, a carboxy group, or a sulphonamido group,
or X and X' together represent the atoms necessary to form a closed benzene ring,
A being bound to the substituted benzotriazole group of Z' via the carbocyclic phenyl group or via the carbocyclic benzo group;

said ultraviolet-absorbing monomer constituting between about 2 and 70% by weight of total monomer present, and said hydrophobic copolymer forming between 8 and 40% by weight of the total weight of dry ultraviolet-absorbing filter layer.

The ultraviolet-absorbing monomers are derived from acrylic acid, methacrylic acid, $\beta$-cyano-acrylic acid, $\beta$-cyano-methacrylic acid, crotonic acid, maleic acid, fumaric acid, citraconic acid, mesaconic acid and itaconic acid and the corresponding half-esters and half-amides, or they are cyclic imides.

By primary dispersions latices are understood that have been prepared directly by emulsion polymerisation of monomers in aqueous medium, contrary to secondary latices, which are obtained by dispersing preformed polymers in water, independently of the manner wherein the polymers themselves have been prepared. These secondary latices can be prepared for instance by dissolving the polymers in an organic medium that is immiscible with water, dispersing the resulting solution in water, and distilling the organic solvent whilst stirring.

The primary dispersions of the ultraviolet-absorbing, hydrophobic copolymers of the invention are prepared by the emulsion copolymerisation process described in our United Kingdom patent specification 1,130,581. This process comprises the steps of:
(a) dispersing the water-insoluble, solid, ultraviolet-absorbing monomer in water containing known emulsifying agents, together with a solvent for the monomer and possibly with at least one other $\alpha,\beta$-ethylenically unsaturated monomer, the solvent being taken from
  (i) organic solvents that are inert in respect of the ultraviolet-absorbing monomer and that do not interfere with the free radical-addition polymerisation thereof,
  (ii) liquid, water-insoluble, ethylenically unsaturated monomers that are copolymerisable with the ultraviolet-absorbing monomer, and
  (iii) mixtures of (i) and (ii);
(b) adding to the liquid dispersion obtained by Step (a) a known polymersation initiator,
(c) and agitating under free radical polymerisation conditions until copolymerisation has occurred.

According to the above-mentioned process the comonomer(s) may be liquid comonomer(s) and in some cases they may serve as solvent for the normally solid monomer. The comonomer(s) may be selected to confer certain required properties on the water-insoluble copolymer.

These and other data including examples of polymerisation initiators, emulsifying agents, and suitable solvents as well as instructions relating to the formation of the initial emulsions and/or suspensions are fully set out in the said United Kingdom patent specification and need not be repeated here in detail.

Among the polymerisation initiators that are suited for use in the above emulsion polymerisation process may be mentioned: persulphates, e.g. ammonium and potassium persulphate, azonitrile compounds, e.g. 4,4'-azobis(4-cyanovaleric acid) as well as peroxide compounds, e.g. benzoyl peroxide and hydrogen peroxide.

As described in the above United Kingdom patent specification surface-active compounds of various classes and that are known per se are available for use as emulsifying agents, i.a. soaps, sulphonates, and sulphates, cationic and amphoteric compounds and high-molecular weight protective colloids.

The latices obtained have a concentration of 5 to 60% by weight of ultra-violet-absorbing copolymer, whereas the copolymer itself comprises between 2 and 70% by weight of polymerised ultraviolet-absorbing monomer.

Ultraviolet-absorbing, solid, water-insoluble monomers suited for emulsion copolymerisation with other $\alpha,\beta$-ethylenically unsaturated monomers to form hydrophobic, ultraviolet-absorbing copolymers are e.g.:

2(2'-hydroxy-4'-methacryloylaminophenyl)-2H-benzotriazole

2(2'-hydroxy-3'-methacryloylamino-5'-methylphenyl)-2H-benzotriazole

2(2'-hydroxy-3'-methacryloylamino-5'-tert.butylphenyl)-2H-benzotriazole

2(2'-hydroxyphenyl)-5-methacryloylamino-2H-benzotriazole

2(2'-hydroxy-4'-methacryloyloxyphenyl)-2H-benzotriazole.

The ultraviolet-absorbing monomers of the invention are copolymerised with at least one other monomer containing at least one ethylenic group, such as acrylic acid, methacrylic acid, $\alpha$-chloro-acrylic acid, the esters and amides derived from acrylic acid, $\alpha$-chloro-acrylic acid and methacrylic acid such as acrylamide, methacrylamide, ethyl acrylate, n-butyl acrylate, 2-ethylhexyl acrylate and lauryl methacrylate, vinyl esters such as vinyl acetate, vinyl propionate and vinyl laurate, acrylonitrile, methacrylonitrile, aromatic vinyl compounds such as styrene and its derivatives, e.g. vinyl toluene, vinyl acetophenone, and sulphostyrene, itaconic acid, citraconic acid, crotonic acid, vinylidene chloride, vinyl alkyl ethers such as vinyl ethyl ether, maleic acid esters, N-vinyl-2-pyrrolidone, N-vinylpyridine, 2- and 4-vinylpyridine.

The ethylenically unsaturated monomers suited for copolymerisation with the ultraviolet-absorbing monomers corresponding to the above general formula can be chosen so that such physical and/or chemical properties of the resulting copolymer as its insolubility in water, its compatibility with the binder of a photographic colloid composition, into which it is to be incorporated, its flexibility, its thermal stability, etc., are favourably influenced. It is possible to introduce, e.g. plasticizing groups in the ultraviolet-absorbing copolymer by using a comonomer carrying such groups, thus favourably influencing the brittleness and flexibility of the layers, into which the copolymer is to be incorporated.

The invention is limited to the incorporation of the ultraviolet-absorbing copolymers of the invention as primary dispersions into ultraviolet-absorbing filter layer compositions for the reasons set forth below. Indeed, these latices may contain high percentages of copolymer, e.g. concentrations of up to 60% by weight and yet possess a relatively low viscosity. When said latices are incorporated into emulsions, the viscosity of the latter is not influenced. With secondary dispersions of copolymers or with solutions of the copolymers in organic solvents there can never be attained such high concentrations. The viscosity of their mixtures with aqueous gelatin solutions increases so fast with rising concentrations that coating becomes totally impossible. Moreover, by the use of the primary dispersions there can be dispensed with the use of organic solvents or alkaline solutions as well as with special dispersing techniques for incorporating the ultraviolet-absorbing copolymers.

We prefer to add the ultraviolet-absorbing copolymers of the invention to the hydrophilic colloid binder material in the form of a primary dispersion. Indeed, the particle size of secondary dispersions is often larger and the stability of these dispersions is found to be inferior to that of the primary dispersions. Besides, the concentration of the primary dispersions can be much higher than could be obtained even with secondary dispersions. Moreover, the secondary dispersions are not so compatible with hydrophilic colloids, e.g. gelatin. When admixed, for instance, with aqueous gelatin solutions they usually produce mat layers. The primary dispersions are usually quite compatible with aqueous gelatin solutions so that very clear layers can be obtained indeed.

The hydrophilic colloid binder material may be gelatin, colloidal albumin, zein, casein, a hydrophilic cellulose derivative, e.g. hydroxyethyl cellulose, or a synthetic hydrophilic colloid such as polyvinyl alcohol and poly-N-vinyl pyrrolidone. If desired compatible mixtures of two or more of the hydrophilic colloids may be employed.

The primary dispersion of hydrophobic ultraviolet-absorbing copolymer is mixed with an aqueous solution of a hydrophilic colloid binder material in such a ratio that between about 8 and 40% by weight of ultraviolet-absorbing copolymer calculated on the total weight of the dry ultraviolet-absorbing filter layer is present. The concentration of the ultraviolet-absorbing compositions is not critical. Usually 0.2 to 1 g. of ultraviolet-absorbing copolymer is used per square meter of filter layer. The optimum coating concentrations depend on the particular ultraviolet-absorbing copolymer used, on the particular photographic element to be protected, and on the extent of protection desired. The optimum coating concentrations for a given photographic element can be determined by methods well known in the art.

The ultraviolet-absorbing copolymers of the invention are not only used in filter layers or on photographic light-sensitive materials, but they can also be used in optical filters such as taking filters and filters in different kinds of densitometers.

It was interesting to form primary latexes of ultraviolet-absorbing copolymers with benzotriazole nuclei and to add them to aqueous solutions of colloid binder materials. Ultraviolet-absorbing compounds should indeed have a high fastness to light and thus be very resistant against the action of ultraviolet radiation. Ultraviolet-absorbing compounds should be resistant also against heat and humidity and their spectral properties should be excellent. Their extinction coefficient in particular should be as high as possible. Normally, the known ultraviolet-absorbing compounds have one or several of these properties to a greater or less degree. The copolymers of the invention with benzotriazole nuclei possess all these properties in a very high degree, so that they are very suited for use as ultraviolet-absorbing compounds in photographic filter layers and optical filters.

The ultraviolet-absorbing copolymers can be mixed in primary dispersion form with an aqueous solution of a colloidal binder, e.g. gelatin, cellulose esters, synthetic resins (such as polyvinyl acetals and hydrolyzed polyvinyl acetate), and the resulting mixture is coated on the light-sensitive layer of the photographic element. When the photographic element is intended for use in colour photography, the ultraviolet filter layer need not be an outer layer. The filter may indeed be applied to one of the layers subject to the harmful effects of ultraviolet radiation. The ultraviolet-absorbing layer may also be coated directly on the support, which may have been provided with known subbing layer or layers before the application of light-sensitive layers thereto. Finally, the mixture of primary dispersion of ultraviolet-absorbing copolymer and of an aqueous solution of a hydrophilic colloid binder material may be incorporated into films, foils, or layers of plastics, or coated as a layer thereon, and the resulting products can be used as protective filter layers or films, e.g. in optical filters and in filters used in densitometers, and as protective layers upon layers containing substances susceptible to degradation or change under the action of ultraviolet radiation, e.g. photographic colour prints.

The following preparations describe the manufacture of the ultraviolet-absorbing monomers and their emulsion copolymerisation with other ethylenically unsaturated monomers.

PREPARATION 1

2(2'-hydroxy-4'-methacryloylphenyl)-2H-benzotriazole 55.2 g. o-nitroaniline are dissolved warm in 80 ml. of acetic acid. 140 ml. of concentrated hydrochloric acid (35%) are added to the resulting solution whilst stirring. The hydrochloride of o-nitroaniline precipitates. The product is cooled to 20° C., whereupon 200 g. of ice-water are added. The suspension is then diazotized at 0° C. with 27.6 g. of sodium nitrite in 50 ml. of water. After filtration the resulting solution is added dropwise at 0 to 5° C. to a solution of 65.5 g. of m-aminophenol in 1.5 l. of water comprising 120 ml. of hydrochloric acid (35%). A red dye separates. After stirring for 5 hours the resulting 6[(o-nitrophenyl)-azo]-m-aminophenolhydrochloride is filtered with suction and dried.

The product is suspended in 750 ml. of water, which is then neutralized with 5 N sodium hydroxide. Subsequently, a solution of 96 g. of sodium hydroxide in 480 ml. of water is added. 78.5 g. of zinc powder is then added portionwise in 15 min. at room temperature whilst stirring. After 30 min. 100 ml. of 5 N sodium hydroxide are added as well as 10 g. of zinc powder. The solution being decolourized now is filtered. The filtrate is cooled, whereupon 250 ml. of acetic acid are added thereto. The resulting precipitate is filtered with suction, washed until free of acid, and dried. It is then recrystallized from n-butylacetate.

The 2(2' - hydroxy-4'-aminophenyl)-2H-benzotriazole formed melts at 206° C.

6.78 g. of the latter product are dissolved at 50° C. in 60 ml. of anhydrous dioxane. To the resulting solution 2.77 g. of anhydrous sodium hydrogen carbonate and 100 mg. of m-dinitrobenzene as inhibiting agent are added. The reaction mixture is stirred at 50° C. whilst adding 3.12 ml. of methacryloyl chloride dropwise. The mixture is then stirred for 5 hours at 50° C.

The reaction mixture is poured out on 200 ml. of ice-water and the resulting precipitate is filtered with suction, collected, and dried. The precipitate is boiled up with 25 ml. of methanol, filtered with suction while still hot, and washed with hot methanol.

2(2' - hydroxy-4'-methacryloylamino-phenyl)-2H-benzotriazole corresponding to the following structural formula is formed:

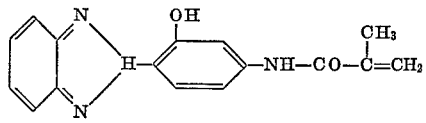

The resulting product melts at 208° C.

PREPARATION 2

2(2'-hydroxyphenyl)-5-methacryloylamino-2H-benzotriazole

A solution of 27.2 g. of o-aminophenol in 250 ml. of water and 83 ml. of hydrochloric acid (35%) is diazotized at 0° C. with a solution of 17.2 g. of sodium nitrite in 35 ml. of water and then added at once to a cooled solution of 36.1 g. of m-phenylenediamine hydrochloride in 500 ml. of water.

To this stirred and cooled solution a solution of 170 g. of sodium acetate in 250 ml. of water is added dropwise, whereupon there is stirred for 2 hours more at 5° C. and for 2 hours at room temperature. The pH of the reaction mixture is then adjusted to 8 by addition of concentrated ammonium hydroxide. The dye is filtered with suction and washed with water.

Yield: 42 g. of 2(2',4'-diaminophenylazo)-phenol melting at 169° C.

45.6 g. of this product are dissolved in 300 ml. of ethylene glycol monomethyl ether and added to a stirred solution of 150 g. of copper(II)sulphate-pentahydrate in 360 ml. of water and 600 ml. of concentrated ammonium hydroxide. After stirring for 2 hours at 95° C. and then cooling, the product is filtered with suction and washed with water to a colourless filtrate.

Subsequently the precipitate is stirred thoroughly for 1 hour in 500 ml. of 5 N hydrochloric acid, filtered with suction, and again suspended in 200 ml. of water adjusted to pH 8 by addition of concentrated ammonium hydroxide, again filtered with suction, washed with water, and dried. After recrystallization from n-butyl acetate and simultaneous treatment with active carbon, 43 g. of 2(2'-hydroxyphenyl)-5-amino - 2H - benzotriazole melting at 213° C. are obtained.

11.3 g. of this product and 0.1 g. of hydroquinone are dissolved at 70° C. in 110 ml. of dioxan and then admixed with 6.3 g. of sodium hydrogen carbonate. To the resulting stirred solution a solution of 5.1 ml. of methacryloyl chloride in 10 ml. of dioxan is added in 30 min. at 60° C. The reaction mixture is then poured out in water, whereupon the product is filtered with suction, washed with water, dried, and recrystallized from ethylene glycol monomethyl ether.

Yield: 11.1 g. of 2(2'-hydroxyphenyl)-5-methacryloylamino-2H-benzotriazole according to the following formula:

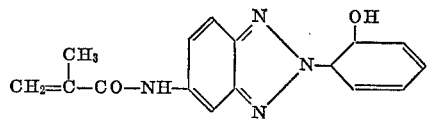

This product melts at 201° C.

PREPARATION 3

2(2'-hydroxy-3'-methacryloylamino-5'-methyl-phenyl)-2H-benzotriazole 25 ml. of nitric acid are added dropwise to a stirred solution of 67.5 g. of 2(2'-hydroxy-5'-methylphenyl)-2H-benzotriazole in 700 ml. of acetic acid at 70° C. 15 min. after the addition of the total amount of nitric acid the reaction mixture is cooled, whereupon the precipitate is filtered with suction and washed with acetic acid and methanol.

Yield: 70 g. of 2(2'-hydroxy-3'-nitro-5'-methylphenyl)-2H-benzotriazole melting at 181° C.

69.5 g. of this compound in 500 ml. of dioxan are reduced at 60° C. with 5 ml. of Raney nickel and a hydrogen pressure of 1500 p.s.i. After filtering off of the Raney nickel the solution is cooled. A crystalline precipitate is filtered with suction and recrystallized from dimethylformamide.

Yield: 27.5 g. of 2(2'-hydroxy-3'-amino-5'-methylphenyl)-2H-benzotriazole.

Analogously to the last part of preparation 1,2(2'-hydroxy-3'-methacryloylamino - 5' - methylphenyl)-2H-benzotriazole melting at 157° C. is formed therefrom. The product is recrystallized from n-butyl acetate and corresponds to the following structural formula:

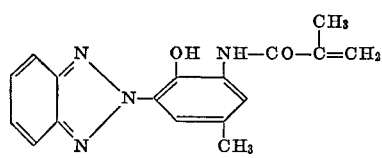

PREPARATION 4

2(2'-hydroxy-3'-methacryloylamino-5'-tert.butylphenyl)-2H-benzotriazole 26 ml. of nitric acid are added dropwise at 40° C. to a stirred solution of 67 g. of 2(2'-hydroxy-5'-tert.butylphenyl)-2H-benzotriazole in 700 ml. of acetic acid. The mixture is stirred for 1 hour at 40° C. and then poured out in water. The precipitate is filtered with suction, washed with water until free of acid, dried, and recrystallized thrice from dimethylformamide.

Yield: 41 g. of 2(2'-hydroxy - 3' - nitro-5'-tert.butylphenyl)-2H-benzotriazole melting at 207° C. 40.5 g. thereof in 500 ml. of dioxan are reduced at 60° C. with 3 ml. of Raney nickel under a hydrogen pressure of 1500 p.s.i. After filtration off the Raney nickel the filtrate is poured out in water, the residue is filtered with suction, washed with water, dried, and recrystallized from acetonitrile. Yield: 24.8 g. of 2(2'-hydroxy - 3' - amino-5'-tert.butylphenyl)-2H-benzotriazole melting at 179° C.

Analogously to the last part of preparation 1,2(2'-hydroxy-3'-methacryloylamino - 5' - tert.butylphenyl)-2H-benzotriazole melting at 170–172° C. is formed therefrom. After recrystallization from ethyl acetate the product corresponding to the following structural formula is obtained:

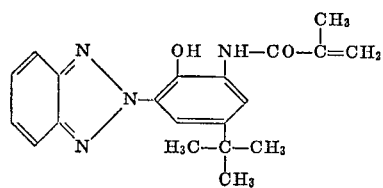

PREPARATION 5

2(2'-hydroxy-4'-methacryloyloxyphenyl)-2H-benzotriazole

To a hot solution of 13.8 g. of o-nitroaniline 50 ml. of hydrochloric acid (35%) is added, so that the hydrochloride is formed. After the addition of 50 g. of ice the suspension is diazotized at 0° C. with a solution of 6.9 g. of sodium nitrite in 15 ml. of water. After filtration the diazonium solution is added dropwise at 0 to 5° C. to a stirred solution of 13.2 g. of resorcinol in 250 ml. of water. Four hours later the azo dye is filtered with suction, washed with water, and dried. Yield: 22.6 g. of 4-[(2'-nitrophenyl)-azo]-resorcinol melting at approximately 220° C. (decomposition).

22 g. thereof are added to a stirred solution of 20.4 g. of sodium hydroxide in 200 ml. of water and 100 ml. of ethanol. The sodium salt of 4 - [(4' - nitrophenyl) - azo]-resorcinol precipitates partially.

Whilst thoroughly stirring 16.8 g. of zinc powder are added at 60° C. The reaction mixture decolourizes within 15 min. After filtration of the zinc powder, the filtrate is acidified with 60 ml. of acetic acid and cooled. The precipitate is filtered with suction, washed with ethanol, and dried. Yield: 14.3 g. of 2(2',4'-dihydroxyphenyl)-2H-benzotriazole melting at 260° C.

6.1 g. thereof are suspended in 50 ml. of dioxan comprising 20 ml. of acetonitrile and 2.33 ml. of pyridine. At room temperature 2.78 ml. of methacryloyl chloride are added dropwise. The reaction mixture is poured out in water; the precipitate is filtered with suction, washed with water, dried and finally recrystallized twice from acetonitrile.

Yield: 0.5 g. of 2(2'-hydroxy-4'-methacryloyloxyphenyl)-2H-benzotriazole melting at 184° C. and corresponding to the following structural formula:

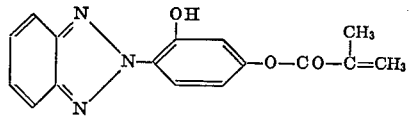

PREPARATION 6

Preparation of a primary dispersion of co[n-butyl acrylate/2(2'-hydroxyphenyl) - 5 - methacryloylamino-2H-benzotriazole]

In a reaction vessel are brought 250 ml. of dimineralized water, 2.5 g. of sodium salt of oleylmethyltauride, 20 g. of 2(2'-hydroxyphenyl) - 5 - methacryloylamino-2H-benzotriazole (of Preparation 2) and 12.5 ml. of tetrahydrofuran. The suspension is rinsed for 10 min. with nitrogen and then heated to 75° C. At this temperature 7.5 g. of n-butylacrylate are added. The mixture is then heated further to 80° C. 2.5 ml. of a 5% aqueous solution of the sodium salt of 4,4'-azo-bis(4-cyanovaleric acid) are added. After 3 min. 22.5 g. n-butyl acrylate and 5 ml. of a same 5% aqueous solution of the sodium salt of 4,4'-azo-bis(4-cyanovaleric acid) are added in 1 hour to two dropping funnels. There is then stirred for 30 min. at 85–86° C., whereupon another 2.5 ml. of the 5% aqueous solution are added. Finally, the mixture is heated at 85–86° C. for 50 min.

The residual monomer and tetrahydrofuran are evaporated in a slight vacuum, whereupon the latex is cooled. 720 mg. of the sodium salt of oleylmethyltauride are then added per 100 ml. of latex as post-stabilizer.

The latex volume is 280 ml. The concentration of the copolymer in the latex is 17.1% by weight. The copolymer is composed of recurring units according to the following structural formulae:

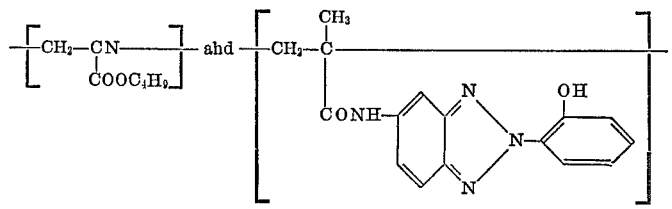

A nitrogen analysis of the separated copolymer proved that it contained 35.2% by weight of units of the ultra-violet-absorbing monomer.

PREPARATION 7

Preparation of a primary dispersion of co[n-butylacrylate/2(2'-hydroxy - 3' - methacrylolylamino-5'-methylphenyl)-2H-benzotriazole]

In a reaction vessel are placed 180 ml. of demineralized water, 16 g. of 2(2'-hydroxy-3'-methacryloylamino-5'-methylphenyl)-2H-benzotriazole (see preparation 3), and 2 g. of the sodium salt of oleylmethyltauride. The resulting suspension is stirred for 30 min. at room temperature whilst rinsing with nitrogen.

The mixture is heated to 90° C. and then admixed with 7 g. of n-butyl acrylate. After emulsification for 5 min., 0.8 ml. of a 5% aqueous solution of the sodium salt of 4,4'-azo-bis(4-cyanovaleric acid) are added. The polymerization starts after a stirring period of 3 min. In 25 min. 17 g. of n-butyl acrylate and 2.4 ml. of a same 5% aqueous solution of the sodium salt of 4,4'-azo-bis(4-cyanovaleric acid) are added. The mixture is then stirred for 40 min. at 95° C. and subsequently another 0.8 ml. of the 5% aqueous solution are added. The mixture is then allowed to polymerize further for 1 hour at 95° C. Traces of residual n-butyl acrylate are removed by evaporation in slight vacuum, whereupon the yellow latex is cooled and filtered. As post-stabilizer an amount of 850 mg. of the sodium salt of oleylmethyltauride per 100 ml. of latex is then added.

The latex has a copolymer concentration of 21.3% and the copolymer consists of recurring units according to the following structural formulae:

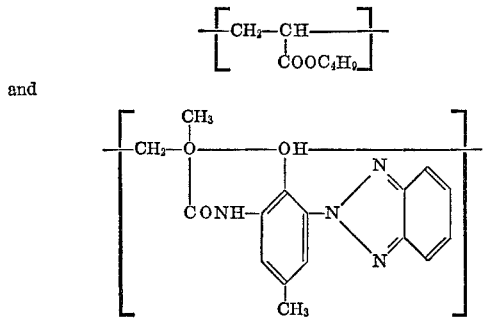

A nitrogen analysis of the collected copolymer proved that it contained 48.5% by weight of units of the ultra-violet-absorbing monomer.

PREPARATION 8

Preparation of a primary dispersion of co[n-butyl acrylate/2(2'-hydroxy - 3' - methacryloylamino-5'-tert.butylphenyl)-2H-benzotriazole]

In a reaction vessel are placed 150 ml. of dimineralized water, 14 g. of 2(2'-hydroxy-3'-methacryloylamino-5'-tert.butylpenyl)-2H-benzotriazole (see Preparation 4), and 1.75 g. of the sodium salt of oleylmethyltauride. The suspension is stirred for 30 min. at room temperature and then heated to 75° C. An amount of 21 g. of n-butylacrylate is added, whereupon the mixture is heated further to 90–92° C. In 5 min. 25 ml. of a 5% aqueous solution of the sodium salt of 4,4'-azo-bis(4-cyanovaleric acid) are added dropwise. The temperature rises to 95° C. There is stirred then for 30 min. at 95° C., whereupon 1 ml. of a same 5% aqueous solution of the sodium salt of 4,4'-azo-bis(4-cyanovaleric acid is added. After 1 h. of stirring at 95° C. the latex is freed from residual butyl acrylate in a slight vacuum, then cooled, and filtered.

Subsequently, 270 mg. of the sodium salt of oleylmethyltauride are added as post-stabilizer per 100 ml. of latex.

The latex contains 17.6% by weight of copolymer that is composed of recurring units corresponding to the following structural formulae:

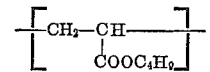

and

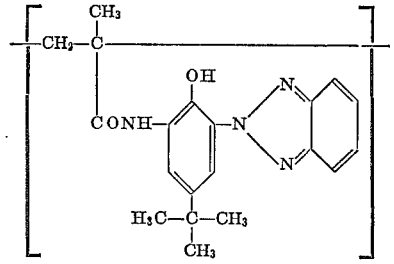

A nitrogen analysis of the collected copolymer proved that it contained 27.2% by weight of units of the ultra-violet-absorbing monomer.

PREPARATION 9

In Preparation 6 a method has been described for the preparation of small quantities of a primary dispersion of co[n-butyl acrylate/2(2-hydroxyphenyl)-5-methacryloylamino-2H-benzotriazole].

According to the following preparation large quantities of the same primary dispersion can be obtained.

In a reaction vessel of 20 l. were brought 13.3 l. demineralized water, 360 g. of sodium salt of oleylmethyltauride and 1440 g. of 2(2'-hydroxyphenyl)-5-methacryloylamino-2H-benzotriazole (of Preparation 2). The whole was stirred slowly for 30 min., while rinsing the space above the liquid reaction mixture with a stream of nitrogen. Thereafter the suspension was heated to 82° C. and rinsing with nitrogen was terminated. At 80–83° C. one fourth (540 g.) of the total amount of n-butyl acrylate (2160 g.) was added, whereafter the mixture was further heated until 90–93° C. At this temperature 180 ml. of a 5% aqueous solution of the sodium salt of 4,4'-azo-bis(4-cyanovaleric acid were added. Polymerisation started after a few minutes and in 2 hours 1640 g. of n-butyl acrylate and 540 ml. of the 5% aqueous solution of the sodium salt of 4,4'-azo-bis(4-cyanovaleric acid) were simultaneously and dropwise added. Polymerisation procedure further for 90 min. at 95–97° C.

The primary dispersion obtained was freed from residual monomer by distilling off approximately 2 l. of liquid whereafter the latex was cooled and filtrated. As post-stabilizer was added 0.65 g. of sodium salt of oleylmethyltauride.

The latex volume was 17 l. and had a concentration of 20.65% by weight. The copolymer particles had an average diameter of 400 A.

The primary dispersion of copolymer thus formed was completely miscible with gelatin and the copolymer had an absorption maximum at 350 nm.

The copolymer was composed of the same recurring units as described in Preparation 6. A nitrogen analysis of the separated copolymer proved that it contained 34.6% by weight of the ultraviolet-absorbing monomer.

EXAMPLE 1

11.7 ml. of phenol as hardening agent, 4.25 ml. of butyl ester of sulphonated castor oil as wetting agent, and 3.75 ml. of latex of the ultraviolet-absorbing copolymer co[n-butyl acrylate/2(2'-hydroxyphenyl)-5-methacryloylamino-2H-benzotriazole of Preparation 6 were added to 117 g. of gelatin and water was added to a volume of 1000 ml. This amount was coated on a glass plate having a surface of 1 m.$^2$ and the layer was dried. In this manner an ultraviolet-absorbing filter was obtained, which could be used as taking filter in photography and as a filter in a densitometer. The filter had an absolute maximum absorption at 352 m$\mu$ and a molar extinction coefficient of $1.72 \times 10^4$. This filter was very resistant against ultraviolet radiation.

In this example the latex of the ultraviolet-absorbing copolymer could be replaced by a same amount of latex obtained according to Preparations 7 and 8, i.e. in the first case the latex of the ultraviolet-absorbing co[n-butyl acrylate/2(2' - hydroxy-3'-methacryloylamino-5'-methylphenyl)-2H-benzotriazole] and in the second case the latex of co[n-butyl acrylate/2(2'-hydroxy-3'-methacryloylamino-5'-tert.butylphenyl)-2H-benzotriazole], which had a maximum absorption at 316 and 315 m$\mu$ respectively.

EXAMPLE 2

A photographic multilayer material as used for the preparation of direct-positive colour images was formed. Each of three integrally coated emulsion layers was sensitized to one of the primary colours, namely blue, green, and red. The top layer was sensitive to blue light and contained a colour coupler for the yellow image. The middle layer was sensitive to green light and contained a colour coupler for the magenta image, whereas the bottom layer was sensitive to red light and contained a colour coupler for the cyan image. A yellow filter layer separated the blue-sensitive and the green-sensitive layers. The different colour couplers and oxidizing coupling compounds were those described in Example 10 of the United Kingdom patent specification 990,628.

65.4 ml. of latex of co[n-butyl acrylate/2(2'-hydroxyphenyl)-5-methacryloylamino - 2H - benzotriazole] (see Preparation 6) were added to 400 ml. of distilled water, wherein 25 g. of gelatin had been dissolved and subsequently the mixture was diluted with distilled water to a volume of 500 ml. and the pH of the mixture was adjusted to 7 by addition of sodium hydroxide. Finally, 5 ml. of saponine and 2 ml. of a 1.25% aqueous solution of chrome alum were added.

On the resulting multilayer colour reversal photographic material there was then coated an ultraviolet-absorbing layer from the thus formed coating composition at a ratio of 50 g./m.$^2$ and the layer was then dried. After treatment in the known photographic baths for colour reversal photographic materials the film was subjected to resistance tests. These tests consisted in exposing the material for 30 h. to the radiation of a 2000-watt xenon lamp and in exposing it for 48 h. at 60° C. to a relative humidity of 95%. In both cases the film protected by the ultraviolet-absorbing layer did not show any signs of yellowing or fading, whereas in an analogous multilayer colour reversal photographic material that did not comprise an ultraviolet-absorbing layer, considerable changes took place in the colour rendering.

EXAMPLE 3

The ultraviolet-absorbing layer of Example 2 was coated on a conventional colour reversal photographic film to serve as a taking filter. The resulting colour reversal transparency was completely free from blue shadowing and blue fringing.

In the same way a conventional colour negative film was coated with a latex of an ultraviolet-absorbing copolymer according to Preparation 6 mixed with an aqueous solution of gelatin. The ultraviolet-absorbing layer completely eliminated blue shadowing and blue fringing in the resulting processed colour negative.

EXAMPLE 4

To a 2.5% aqueous solution of gelatin 16 g. of a latex according to Preparation 6, comprising 20% by weight of solids, were added per gram of gelatin as well as the usual coating aids (wetting agents and hardening agents). The resulting mixture was coated at a ratio of 1 g. of gelatin per m.$^2$ to form a covering layer on a conventional photographic silver halide multilayer colour material. This covering layer was intended to protect the colours obtained after the processing against the influence of ultraviolet radiation. The colour stability of the finished image was improved considerably thereby.

EXAMPLE 5

The back of a multilayer colour reversal photographic material was coated at a ratio of 1.5 g. of gelatin per m.$^2$ with a solution of gelatin and an antihalation dye, to which 10 g. of the latex of the ultraviolet-absorbing copolymer of Preparation 6 had been added per gram of gelatin. The resulting antihalation layer served to protect a diapositive colour material from light striking the back of the material, as occurs during projection or in diapositive show-glasses. The antihalation dye could be a known organic dye or common colloidal black silver. The results obtained with this ultraviolet-absorbing backing layer were very good.

EXAMPLE 6

A paper sheet coated with a baryta layer was covered with a gelatin layer containing per gram of gelatin 15 g. of latex of the ultraviolet-absorbing copolymer prepared according to Preparation 6. The resulting ultraviolet-absorbing layer was coated with a series of light-sensitive photographic layers and other layers to produce a multicolour photographic material, the consecutive layers were the following:

(1) A blue-sensitive gelatin silver chlorobromide emulsion containing a coupler for the yellow image,
(2) A gelatin interlayer,
(3) A green-sensitive gelatin silver chlorobromide emulsion containing a colour coupler for the magenta image,
(4) A gelatin interlayer,
(5) A red-sensitive gelatin silver chlorobromide emulsion containing a colour coupler for the cyan image,
(6) A gelatin protection overcoat.

The resulting sensitive multicolour photographic material could be exposed and processed to produce the desired dye image. The material was very fast yellowing.

The same latex of Preparation 6 could also be applied alone or in admixture with an aqueous solution of gelatin to a colour print or paper by spraying or brushing to form a protective layer against ultraviolet radiation.

We claim:
1. A photographic element comprising a light-sensitive material protected against ultraviolet radiation by an ultraviolet-absorbing composition which is a mixture of an aqueous solution of a hydrophilic colloid binder material and a primary dispersion with a concentration of 5 to 60% by weight of a hydrophobic ultraviolet-absorbing co-polymer obtained by emulsion co-polymerization of at least one alpha, beta-ethylenically unsaturated monomer with a co-polymerizable ultraviolet-absorbing, solid, water-insoluble monomer according to the following structural formula:

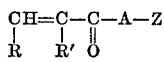

wherein:
Z=H or Z' which represents a substituted benzotriazole group of the formula:

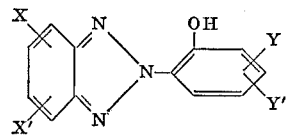

R=H, —CH$_3$, —CN, —COOH, or —COAZ',
R'=H, —CH$_3$, or —CH$_2$COAZ' (in the latter case R being H),
A=—O— or —NH—,
or A and R together with —CH=CR'—CO— form a cyclic imide ring substituted with benzotriazole group of Z' (in this case R' being H or —CH$_3$),
or A and R' together with —C—CO— form a cyclic imide ring substituted with the benzotriazole group of Z' (in this case R being H),
at least one of R, R', or Z must include the substituted benzotriazole group of Z',
each of X, X', Y, and Y' (same or different) represents a hydrogen atom, an alkyl group of 1 to 4 carbon atoms, an alkoxy group, a halogen atom, a carboxy group, or a sulphonamido group,
or X or X' together represent the atoms necessary to form a closed benzene ring,
A being bound to the substituted benzotriazole group of Z' via the carbocyclic phenyl group or via the carbocyclic benzo group;
said ultraviolet-absorbing monomer constituting between about 10 and 70% by weight of total monomer present, and said hydrophobic co-polymer forming between 8 and 40% by weight of the total weight of dry ultraviolet-absorbing filter layer.

2. A photographic element according to claim 1 wherein the ultraviolet-absorbing composition is applied as a filter layer on top of a light-sensitive silver halide emulsion layer.

3. A photographic element according to claim 1 wherein the ultraviolet-absorbing filter layer is applied as an interlayer between the support and a light-sensitive silver halide emulsion layer.

4. A photographic element according to claim 1 wherein said hydrophilic colloid binder material is gelatin.

5. A photographic element according to claim 4 wherein said ultraviolet-absorbing monomer is 2(2'-hydroxy-4'-methacryloylaminophenyl)2H-benzotriazole.

6. A photographic element according to claim 4 wherein said ultraviolet-absorbing monomer is 2(2'-hydroxyphenyl)-5-methacryloylamino-2H-benzotriazole.

7. A photographic element according to claim 4 wherein said ultraviolet-absorbing monomer is 2(2'-hydroxy-4'-methacryloyloxyphenyl)-2H-benzotriazole.

8. A finished photographic element comprising a support having thereon a plurality of developed and fixed photographic light-sensitive silver halide emulsion layers containing developed dye images subject to fading by the action of ultraviolet radiation, said finished photographic element being protected by the application thereto of an ultraviolet-absorbing composition which is a mixture of an aqueous solution of a hydrophilic colloid binder material and a primary dispersion with a concentration of 5 to 60% by weight of a hydrophobic ultraviolet-absorbing co-polymer obtained by emulsion co-polymerization of at least one alpha,beta-ethylenically unsaturated monomer with a co-polymerizable ultraviolet-absorbing, solid, water-insoluble monomer according to the following structural formula:

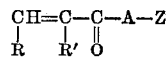

wherein:
Z=H or Z' which represents a substituted benzotriazole group of the formula:

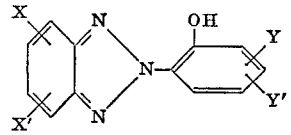

R=H, —CH$_3$, —CN, —COOH, or —COAZ',
R'=H, —CH$_3$, or —CH$_2$COAZ' (in the latter case R being H),
A=—O— or —NH—,
or A and R together with —CH=CR'—CO— form a cyclic imide ring substituted with the benzotriazole group of Z' (in this case R' being H or —CH$_3$),
or A and R' together with —C—CO— form a cyclic imide ring substituted with the benzotriazole group of Z' (in the case R being H),
at least one of R, R', or Z must include the substituted benzotriazole group of Z',
each of X, X', Y, and Y' (same or different) represents a hydrogen atom, an alkyl group of 1 to 4 carbon atoms, an alkoxy group, a halogen atom, a carboxy group, or a sulphonamido group,
or X or X' together represent the atoms necessary to form a closed benzene ring,
A being bound to the substituted benzotriazole group of Z' via the carbocyclic phenyl group or via the carbocyclic benzo group;
said ultraviolet-absorbing monomer constituting between about 10 and 70% by weight of total monomer present, and said hydrophobic co-polymer forming between 8 and 40% by weight of the total weight of dry ultraviolet-absorbing filter layer.

9. A finished photographic element according to claim 8 wherein said hydrophilic colloid binder material is gelatin.

10. A finished photographic element according to claim 9 wherein said ultraviolet-absorbing monomer is 2(2'-hydroxy-4'-methacryloylamino-phenyl) - 2H - benzotriazole.

11. A finished photographic element according to claim 9 wherein said ultraviolet-absorbing monomer is 2(2'-hydroxyphenyl) - 5 - methacryloylamino - 2H - benzotriazole.

12. A finished photographic element according to claim 9 wherein said ultraviolet-absorbing monomer is 2(2'-hydroxy - 4' - methacryloyloxyphenyl) - 2H - benzotriazole.

References Cited
UNITED STATES PATENTS

| | | | |
|---|---|---|---|
| 3,218,332 | 11/1965 | Heller et al. | 252—300 |
| 3,072,585 | 1/1963 | Milionis et al. | 96—84 R |
| 3,159,646 | 12/1964 | Milionis et al. | 252—300 |
| 3,330,656 | 7/1967 | Schuler | 96—84 R |

RONALD H. SMITH, Primary Examiner

U.S. Cl. X.R.
117—33.3; 252—300